US012586777B2

(12) United States Patent
Song et al.

(10) Patent No.: US 12,586,777 B2
(45) Date of Patent: Mar. 24, 2026

(54) NANOCOMPOSITE CATHODE ELECTRODE, MANUFACTURING METHOD THEREOF, AND SECONDARY BATTERY INCLUDING THE SAME

(71) Applicant: KOREA RESEARCH INSTITUTE OF STANDARDS AND SCIENCE, Daejeon (KR)

(72) Inventors: Jae Yong Song, Daejeon (KR); Ho Sun Shin, Daejeon (KR); Ji Hye Park, Daejeon (KR); Sun Hwa Park, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 615 days.

(21) Appl. No.: 18/075,480

(22) Filed: Dec. 6, 2022

(65) Prior Publication Data

US 2023/0178714 A1 Jun. 8, 2023

(30) Foreign Application Priority Data

Dec. 6, 2021 (KR) ........................ 10-2021-0173278
Nov. 18, 2022 (KR) ........................ 10-2022-0155438

(51) Int. Cl.

*H01M 4/36* (2006.01)
*H01M 4/02* (2006.01)
*H01M 4/38* (2006.01)
*H01M 4/60* (2006.01)

(52) U.S. Cl.

CPC ............. *H01M 4/364* (2013.01); *H01M 4/38* (2013.01); *H01M 4/60* (2013.01); *H01M 2004/028* (2013.01)

(58) Field of Classification Search

None
See application file for complete search history.

(56) References Cited

U.S. PATENT DOCUMENTS

| | | | | |
|---|---|---|---|---|
| 2022/0336811 A1* | 10/2022 | Kang | .................. | C07D 241/46 |
| 2022/0384809 A1* | 12/2022 | Kim | ...................... | H01M 4/587 |
| 2023/0335795 A1* | 10/2023 | An | .......................... | H01M 4/58 |
| 2024/0010624 A1* | 1/2024 | Uddin | .................. | C07D 279/22 |

(Continued)

FOREIGN PATENT DOCUMENTS

| | | |
|---|---|---|
| KR | 20180033328 A | 4/2018 |
| KR | 20180079881 A | 7/2018 |

(Continued)

OTHER PUBLICATIONS

Lu, Yong et al., "Design strategies toward enhancing the performance of organic electrode materials in metal-ion batteries", Chem, vol. 4, pp. 2786-2813 (2018).

*Primary Examiner* — Kevin M Bernatz
(74) *Attorney, Agent, or Firm* — Bridgeway IP Law Group, PLLC; Sang Ho Lee; Hyun Woo Shin

(57) ABSTRACT

According to one aspect of the present invention, a nanocomposite cathode electrode is manufactured by mixing a cathode active material, a conductive material, and a binder and curing a resultant mixture, wherein the cathode active material may include a first mixture of a p-type organic compound and an n-type organic compound, or a second mixture of the p-type organic compound and metal powder.

14 Claims, 17 Drawing Sheets

(56) References Cited

U.S. PATENT DOCUMENTS

| | | | | |
|---|---|---|---|---|
| 2024/0363865 | A1* | 10/2024 | Luo .................. | H01M 10/0568 |
| 2025/0253319 | A1* | 8/2025 | Jo ........................... | H01M 4/60 |

FOREIGN PATENT DOCUMENTS

| | | | |
|---|---|---|---|
| KR | 20200070925 | A | 6/2020 |
| KR | 10-2021-0057272 | A | 5/2021 |
| KR | 20210056781 | A | 5/2021 |
| KR | 102280793 | A | 7/2021 |

* cited by examiner

NANOCOMPOSITE CATHODE ELECTRODE, MANUFACTURING METHOD THEREOF, AND SECONDARY BATTERY INCLUDING THE SAME

CROSS-REFERENCE TO RELATED APPLICATION(S)

This application claims the benefit under 35 USC § 119(a) of Korean Patent Application Nos. 10-2021-0173278, filed on Dec. 6, 2021 and 10-2022-0155438, filed on Nov. 18, 2022, in the Korean Intellectual Property Office, the entire disclosure of which is incorporated herein by reference for all purposes.

BACKGROUND

1. Field

The following description relates to a battery, and more particularly, to a positive electrode, a manufacturing method thereof, and a secondary battery including the same.

2. Description of Related Art

Recently, as the demand for using secondary batteries in various application fields such as small mobile devices and electric vehicles increases, there is a growing need to optimize the performance of secondary batteries. In particular, studies on new cathode active material candidates with a large capacity and a high energy density that are low cost and environmentally friendly are being actively conducted.

Conventionally used transition metal oxide-based cathode active materials, such as lithium cobalt oxide or lithium nickel cobalt manganese oxide, are difficult to have a large capacity. In addition, since environmental pollution is caused in the process of producing and recycling these materials, research on alternative materials is required. In order to solve these drawbacks, secondary batteries using an organic compound-based cathode active material are considered. However, in the case of a secondary battery using an organic compound, a lifespan of the secondary battery is shortened due to a high solubility of the organic active material.

PRIOR ART DOCUMENT

Patent Document

1. Korean Registered Patent Publication No. KR2280793B1 (Jul. 16, 2021)

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a cathode active material for improving a short lifespan of a secondary battery due to a high solubility of a cathode active material, a manufacturing method thereof, and a secondary battery using the same. However, the objects are exemplary, and the scope of the present invention is not limited thereto.

In one general aspect, there is provided a nanocomposite cathode electrode being manufactured by mixing a cathode active material, a conductive material, and a binder and curing a resultant mixture, wherein the cathode active material includes a first mixture of a p-type organic compound and an n-type organic compound, or a second mixture of the p-type organic compound and metal powder.

According to the nanocomposite cathode electrode, the cathode active material may include the first mixture and the p-type organic compound may include a phenazine derivative.

According to the nanocomposite cathode electrode, the p-type organic compound may include 5,10-dihydro 5,10-dimethylphenazine (DMPZ).

According to the nanocomposite cathode electrode, the n-type organic compound may be selected to have a molecular weight greater than that of the p-type organic compound.

According to the nanocomposite cathode electrode, the molecular weight of the n-type organic compound may be 300 g/mol or more.

According to the nanocomposite cathode electrode, the n-type organic compound may include perylenetetracarboxylic dianhydiride (PTCDA), 3,4,9,10-perylenetetracarboxylic diimide (PTCDI), or flavanthrone (FVT).

According to the nanocomposite cathode electrode, the p-type organic compound may include 5,10-dihydro 5,10-dimethylphenazine (DMPZ), the n-type organic compound may include PTCDA, and in the cathode active material, the DMPZ may be present in an amount of 70% or more by weight and less than 80% by weight, and the PTCDA may be present in an amount of 20% or more by weight and less than 30% by weight.

According to the nanocomposite cathode electrode, the cathode active material may include the second mixture and the p-type organic compound may include DMPZ.

According to the nanocomposite cathode electrode, the cathode active material may include the second mixture and the metal powder may be selected to have an ionization energy less than that of Cu.

According to the nanocomposite cathode electrode, the metal powder may include Al, V, or Ru.

In another general aspect, there is provided a method of manufacturing a nanocomposite cathode electrode including forming a mixture by mixing a cathode active material, a conductive material, and a binder and curing the mixture, wherein the cathode active material includes a first mixture of a p-type organic compound and an n-type organic compound, or a second mixture of the p-type organic compound and metal powder.

According to the method of manufacturing a nanocomposite cathode electrode, the first mixture may be formed by cryo-mixing the p-type organic compound and the n-type organic compound.

According to the method of manufacturing a nanocomposite cathode electrode, in the first mixture, particles of the n-type organic compound may be mixed in a form attached to particles of the p-type organic compound.

In still another general aspect, there is provided a secondary battery including the nanocomposite cathode electrode described above.

Other features and aspects will be apparent from the following detailed description, the drawings, and the claims.

Figure 1:
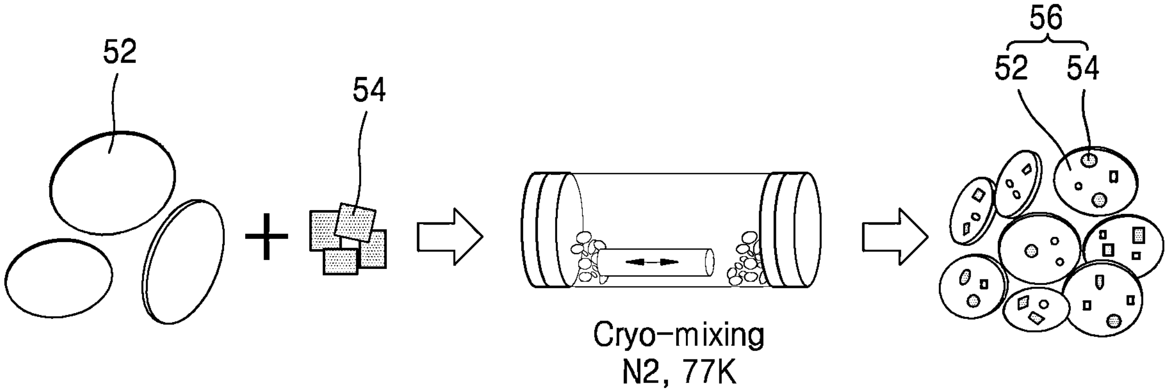
FIG. 1 is a schematic diagram illustrating the manufacture of a cathode active material according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, preferred embodiments of the present invention will be described with reference to the accompanying drawings. However, the present invention is not limited to the following embodiments and may be embodied in various forms. These embodiments are provided so that this disclosure will be thorough and complete, and will fully convey the scope of the invention to those skilled in the art.

Unless otherwise defined, all terms used herein, including technical and scientific terms, have the same meaning as commonly understood by one of ordinary skill in the art to which the inventive concept belongs. Throughout the disclosure, like reference numerals refer to like elements. Also, thickness or sizes of at least some elements may be exaggerated or reduced in the drawings for convenience of explanation and clarity.

FIG. 1 is a schematic diagram illustrating the manufacture of a cathode active material according to an embodiment of the present invention.

Referring to FIG. 1, a cathode active material may include a first mixture 56 of a p-type organic compound 52 and an n-type organic compound 54. For example, the cathode active material may be based on the p-type organic compound 52 and may supplementarily include the n-type organic compound 54. In this case, the cathode active material may have a PN-nanocomposite or a PN-hybrid structure.

In the cathode active material, the p-type organic compound 52 may refer to a material capable of donating electrons and thus undergoing oxidation first and then being reversibly reduced. Accordingly, when the p-type organic compound 52 is used as a cathode active material, a charging process may be performed first. In the cathode active material, the n-type organic compound 54 may refer to a material capable of accepting electrons and thus undergoing reduction first and then being reversibly oxidized. Accordingly, when the n-type organic compound 54 is used as a cathode active material, a discharge process may be performed first.

For example, the p-type organic compound 52 may include an electron withdrawing group (EWG). Examples of the EWG may include —CN, —SO3R, —COOR, —COR, —NO2, —NR3+, and —CX3. Here, R is a hydrogen or hydrocarbon-based compound, and when there are two or more R's in one functional group, each R may be all the same or all different. X is composed of any one of F, Cl, Br, and I, and when there are two or more X's in one functional group, each X may be all the same or all different.

In some embodiments, the p-type organic compound 52 may include phenazine derivatives. For example, the p-type organic compound 52 may include dimethylphenazine (DMPZ) that has a high redox potential and can exhibit very high capacity. DMPZ is represented by Formula 1 shown below.

[Formula 1]

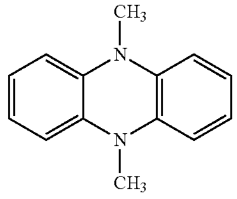

In a cathode active material, the n-type organic compound 54 may include an electron donating group (EDG). Examples of the EDG may include —NR2, —OR, —NHCOR, —OCOR, —C6H5, and an alkyl group. Here, R is a hydrogen or hydrocarbon-based compound, and when there are two or more R's in one functional group, each R may be all the same or all different.

In a cathode active material, the n-type organic compound 54 may be added in a manner that compensates for the disadvantages of the p-type organic compound 52. For example, the n-type organic compound 54 may be selected from organic monomers having a high molecular weight in order to suppress elution of the p-type organic compound 52. More specifically, the n-type organic compound 54 may be selected to have a molecular weight greater than that of the p-type organic compound 52.

For example, when the p-type organic compound 52 is DMPZ, the molecular weight thereof is approximately 210.27 g/mol. In this case, the molecular weight of the n-type organic compound 54 may be 219 g/mol or more, even more 300 g/mol or more to sufficiently suppress elution. More specifically, the n-type organic compound may include perylenetetracarboxylic dianhydiride (PTCDA), 3,4,9,10-Perylenetetracarboxylic diimide (PTCDI), or flavanthrone (FVT). The molecular weight of PTCDA may be approximately 392 g/mol, the molecular weight of PTCDI may be approximately 418 g/mol, and the molecular weight of FVT may be approximately 408 g/mol.

For example, PTCDA can be represented by Formula 2 below.

[Formula 2]

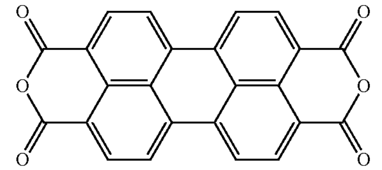

For example, the structure of PTCDI may be represented by Formula 3 below.

[Formula 3]

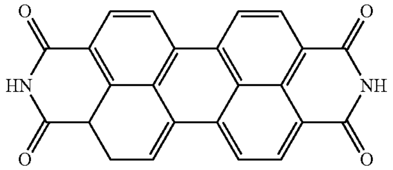

For example, the structure of FVT may be represented by Formula 4 below.

[Formula 4]

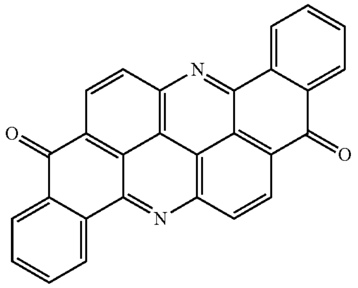

In some embodiments, the first mixture 56 in the cathode active material may be formed by cryo-mixing the p-type organic compound 52 with the n-type organic compound 54. Furthermore, in the first mixture 56, particles of the n-type organic compound 54 may be mixed in a form attached to particles of the p-type organic compound 52.

In other embodiments of the present invention, the cathode active material may include the p-type organic compound 52 and a second mixture of metal powder. The second mixture may refer to the first mixture 56 of FIG. 1.

The metal powder may be selected to have a relatively low ionization energy to prevent a decrease in lifespan due to the elution of the p-type organic compound 52. For example, the metal powder may be selected to have an ionization energy less than the ionization energy of copper (Cu). Further, the metal powder may include Al, V, or Ru. The ionization energy of Al, V, Ru, and Cu may be 577, 650, 711, and 745 eV, respectively. Thus, the ionization energy of the metal powder may be less than 745 eV, and further 711 eV or less.

2 is a schematic cross-sectional view showing a secondary battery 100 including a cathode electrode using a cathode active material according to embodiments of the present invention.

Figure 2:
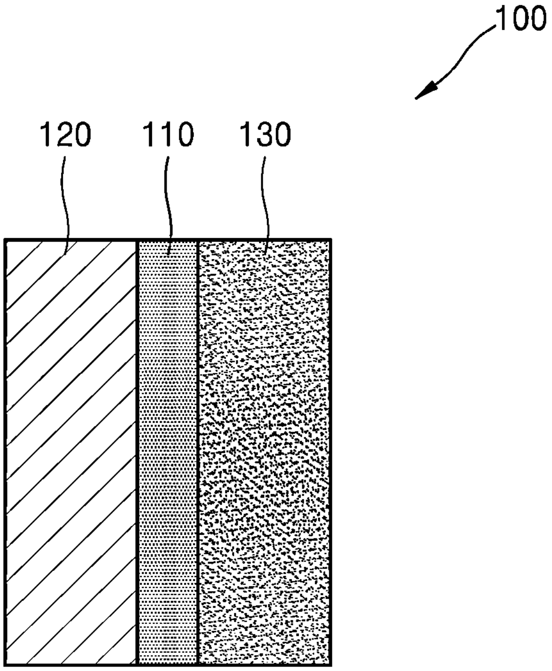
FIG. 2 is a schematic cross-sectional view of a secondary battery including a cathode electrode using a cathode active material according to embodiments of the present disclosure.

Referring to FIG. 2, a secondary battery may include a separator 110, an anode electrode 120, and a cathode electrode 130.

The cathode electrode 130 may include the cathode active material described above. For example, the cathode electrode 130 may be prepared by mixing the cathode active material, a conductive material, and a binder and curing the resultant mixture. The cathode active material may include a first mixture 56 or a second mixture.

The conductive material is used to impart conductivity to the electrode, and any conductive material may be used as long as it has electric conductivity without causing chemical change. Examples of the conductive material may include porous carbon materials such as graphite, carbon black, Ketjenblack®, acetylene black, channel black, furnace black, lamp black, summer black, carbon fiber, and super P; metal powders or metal fibers such as copper, nickel, aluminum, and silver; conductive metal oxides such as zinc oxide, titanium oxide, and the like; or conductive polymers such as polyphenylene derivatives, and any one thereof or a mixture of two or more thereof may be used.

The binder is a material that contributes to adhesion of the cathode active material, and may be a binder material generally used in a cathode electrode for a secondary battery. Examples of the binder may include polytetrafluoroethylene (PTFE), polyvinylidene fluoride (PVDF), vinylidene fluoride-hexafluoropropylene copolymer (PVDF-co-HFP), polyvinyl alcohol, is polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulphonated-EPDM, styrene butadiene rubber (SBR), fluororubber, or various copolymers thereof, and any one thereof or a mixture of two or more thereof may be used.

The anode electrode 120 may include various materials, for example, lithium metal. In some embodiments, the anode electrode 120 may include graphite or silicone. The anode electrode 120 may be an organic active material-based or inorganic active material-based electrode. Further, the anode electrode 120 may be a composite electrode in which an organic active material or an inorganic active material is mixed with a conductive material and a binder in a solid phase, or be of a structure in which a layer of an organic active material or an inorganic active material is coupled to a conductive collector.

The separator 110 may use a porous material that allows ions to pass without allowing electrolyte to pass. For example, a polypropylene (PP) membrane, a polyethylene (PE) membrane, or the like may be used.

In some embodiments, the secondary battery 100 may have a coin cell structure.

Hereinafter, a method of manufacturing the nanocomposite cathode electrode 130 will be described.

Figure 3:
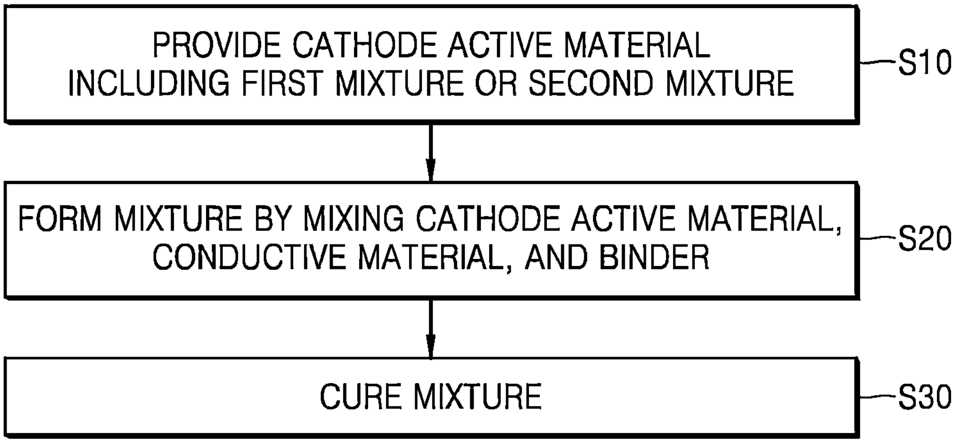
FIG. 3 is a flowchart illustrating a method of manufacturing a nanocomposite cathode electrode according to one embodiment of the present invention.

FIG. 3 is a flowchart illustrating a method of manufacturing a nanocomposite cathode electrode according to one embodiment of the present invention.

Referring to FIGS. 1 to 3, a method of manufacturing the nanocomposite cathode electrode 130 may include forming a mixture by mixing a cathode active material, a conductive material, and a binder (S20) and curing the mixture (S30). In some embodiments, the method of manufacturing the cathode electrode 130 may further include providing a cathode active material is including a first mixture 56 or a second mixture (S10) before forming the mixture (S20).

In operation S10 of providing the cathode active material, the first mixture 56 may be formed by cryo-mixing a p-type organic compound 52 with an n-type organic compound 54. When the p-type organic compound 52 and the n-type organic compound 54 described above are mixed through cryo-mixing, particles of the n-type organic compound 54 may be mixed in a form attached to particles of the p-type organic compound 52.

Similarly, the second mixture may be prepared by cryo-mixing the p-type organic compound 52 with metal powder.

The operation S30 of curing the mixture may be performed by emitting light or transferring heat to the solid mixture.

In some embodiments, the cathode electrode 130 may include 30 to 50% by weight of the cathode active material, 30 to 50% by weight of the conductive material, and 10 to 30% by weight of the binder, more narrowly, 40% by weight of the cathode active material, 40% by weight of the conductive material, and 20% by weight of the binder.

In some embodiments, the cathode electrode 130 may be formed by stacking such a mixed structure on a collector.

Hereinafter, specific Examples of the present invention will be described.

Example 1

A PN-nanocomposite cathode electrode according to Example 1 included a cathode active material, a conductive material, and a binder. A method of manufacturing a PN-nanocomposite cathode electrode is as follows:

The cathode active material included DMPZ and PTCDA, which were mixed through a cryo-mixing process. Any mixing ratio of DMPZ and PTCDA may be used, but their weight percentages (% by weight) should be greater than 0 and less than 100, respectively. That is, DMPZ and PTCDA should be all included in the cathode active material. Preferably, the composition ratio of DMPZ may be 70% by weight or greater and less than 80% by weight and the composition of PTCDA may be 20% by weight or greater and less than 30% by weight, and more preferably, the composition ratio of DMPZ may be 75% by weight and the composition ratio of PTCDA may be 25% by weight.

Ketjenblack® was used as a conductive material, and polytetrafluoroethylene (PTFE) was used as a binder.

A cathode electrode composition contained 40% by weight of the cathode active material, 40% by weight of Ketjenblackg, and 20% by weight of PTFE. A solid mixture was prepared by solid-phase mixing of the cathode active material, Ketjenblack®, and PTFE at the above composition ratio, and the solid mixture was cured to prepare a PN-nanocomposite cathode electrode.

Comparative Example 1-1

Comparative Example 1-1 was the same as Example 1 above, except that DMPZ was used alone as the cathode active material.

Comparative Example 1-2

Comparative Example 1-2 was the same as Example 1 above, except that PTCDA was used alone as the cathode active material.

Example 2

A cathode active material included DMPZ and PTCDI. Example 2 was substantially the same as Example 1, except that PTCDI was used instead of PTCDA as an n-type organic compound.

Comparative Example 2

Comparative Example 2 was the same as Example 2, except that PTCDI was used alone as the cathode active material.

Example 3

A cathode active material included DMPZ and FVT. Example 3 was substantially the same as Example 1, except that FVT was used instead of PTCDA as an n-type organic compound.

Comparative Example 3

Comparative Example 3 was the same as Example 3, except that FVT was used alone as the cathode active material.

Example 4

A cathode active material included DMPZ and 2,3-diaminophenazine (DAP). Example 4 was substantially the same as Example 1, except that DAP was used instead of PTCDA as an n-type organic compound.

Comparative Example 4

Comparative Example 4 was the same as Example 4, except that DAP was used alone as the cathode active material.

Example 5

A cathode active material included DMPZ and Al powder. The Al powder may be approximately 100 to 500 nm in diameter, and the ratio (wt %) of DMPZ:Al in the cathode active material may be 4:1. Preparation of a cathode electrode using the cathode active material of Example 5 may refer to Example 1.

Example 6

A cathode active material included DMPZ and V powder. The V powder may be approximately 50 to 500 nm in diameter, and the ratio (wt %) of DMPZ:V in the cathode active is material may be 4:1.

Example 7

A cathode active material included DMPZ and Ru powder. The Ru powder may be approximately 200 to 2000 um in diameter, and the ratio (wt %) of DMPZ:Ru in the cathode active material may be 1:1.

Comparative Example 5

A cathode active material included DMPZ and Cu powder. The ratio (wt %) of DMPZ:Cu in the cathode active material may be 2:1.

Comparative Example 6

A cathode active material included DMPZ and B powder. The ratio (wt %) of DMPZ:B in the cathode active material may be 4:1.

Comparative Example 7

A cathode active material included DMPZ and Zn powder. The ratio (wt %) of DMPZ:Zn in the cathode active material may be 3:1.

Figure 4A:
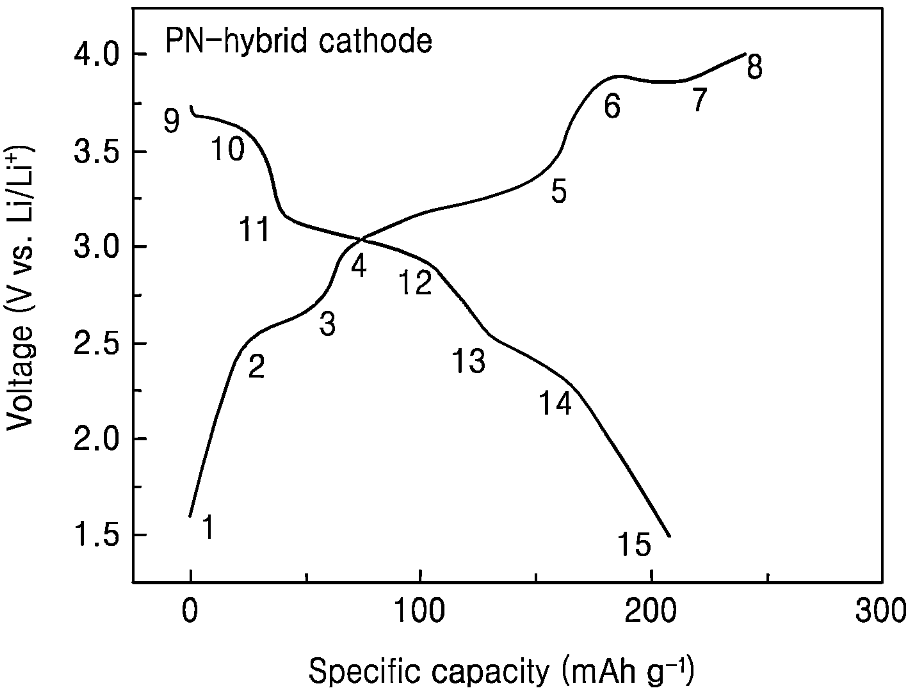
FIGS. 4A, 4B, 4C and 4D are graphs showing characteristics of secondary batteries using positive electrode active materials according to Example 1 and Comparative Examples 1-1 and 1-2.
Figure 4B:
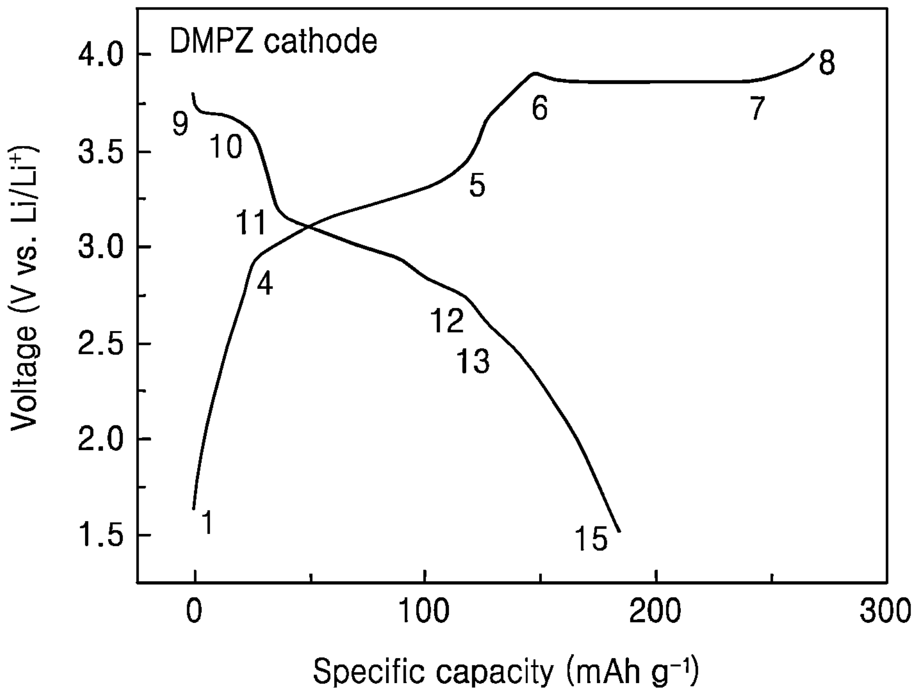
Figure 4C:
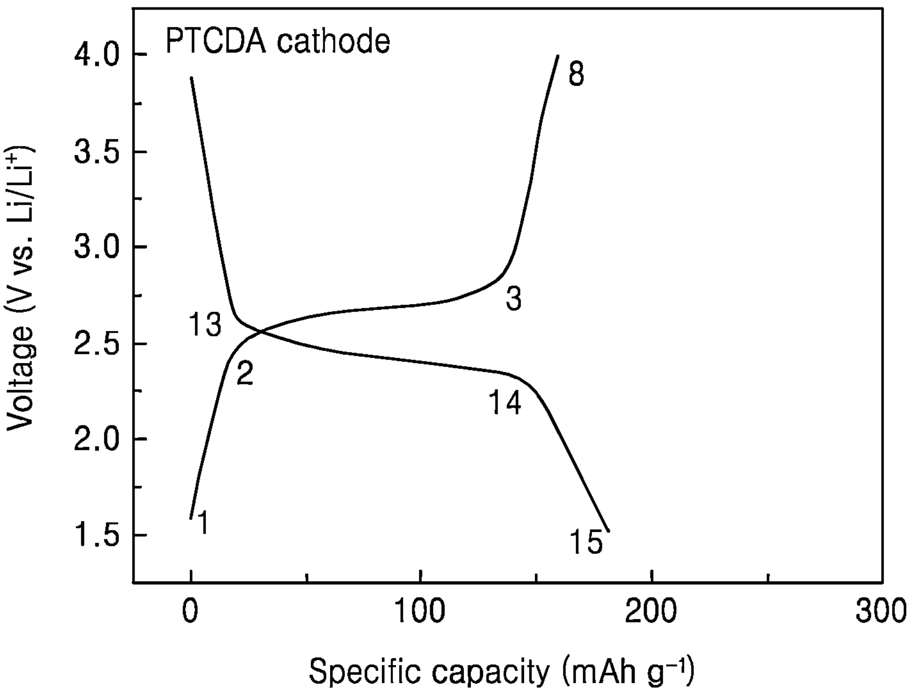

FIG. 4A shows CV characteristics of the secondary battery using the cathode active material of Example 1, FIG. 4B shows CV characteristics of the secondary battery using the cathode active material of Comparative Example 1-1, and FIG. 4C shows CV characteristics of the secondary battery using the cathode active material of Comparative Example 1-2.

The numbers shown on the graphs of FIGS. 4A to 4C denote the order in which one cycle proceeds. That is, the number "1" denotes the start point of a cycle and the number "15" denotes the end point of the cycle, and thus it can be understood that each cycle proceeds in the ascending order from 1 to 15.

In the case of Example 1, as shown in FIG. 4A, a total of three voltage plateaus are observed in the ranges of 2.5 to 2.7 V, 3.0 to 3.2 V, and 3.6 to 3.8 V on the graph. In the case of Comparative Example 1-1, as shown in FIG. 4B, two voltage plateaus are observed in the ranges of 3.0 to 3.2 V and 3.6 to 3.8 V. In the case of Comparative Example 1-2, as shown in FIG. 4C, a voltage plateau is observed in the range of 2.5 to 2.7 V.

From the results described above, it can be seen that all voltage plateaus observed in Comparative Examples 1-1 and 1-2 occurred in Example 1. Therefore, it can be seen that Example 1 exhibits all individual characteristics while suppressing elution of each material through hybridization of the p-type organic compound and the n-type organic compound and shows high capacity characteristics.

Figure 4D:
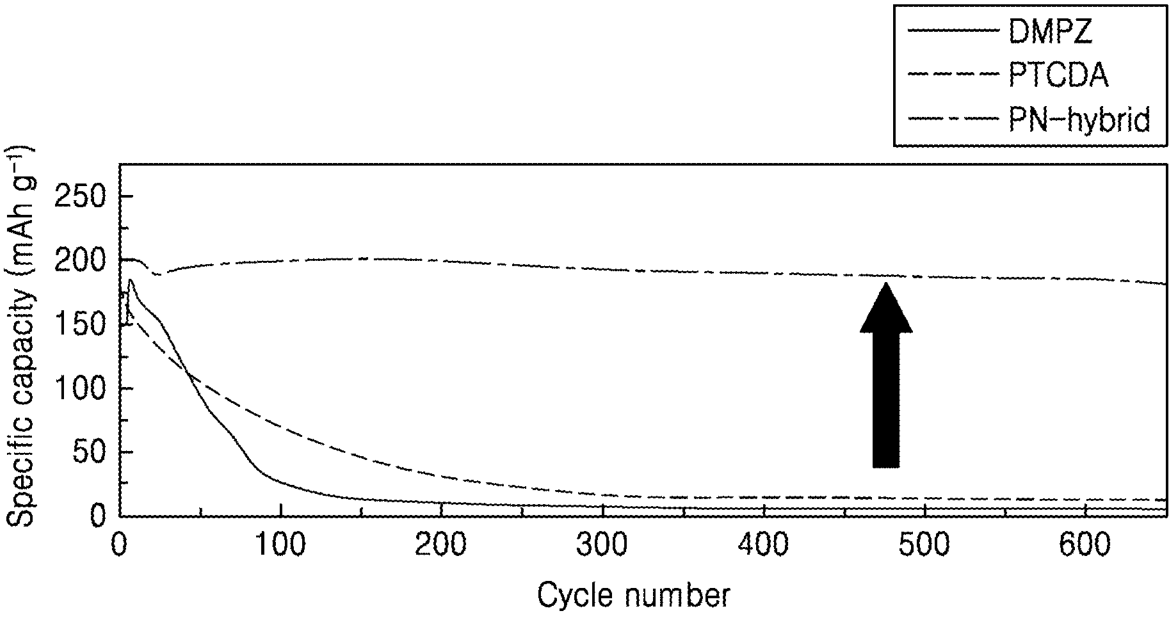

FIG. 4D is a graph showing cycle characteristics of the cathode electrodes, showing a discharge capacity (mAh/g) according to the number of cycles of the cathode electrode (Comparative Example 1-1) including DMPZ as a p-type organic compound, the cathode electrode (Comparative Example 1-2) including PTCDA as an n-type organic compound, and the PN-nanocomposite cathode electrode (Example 1) in which DMPZ and PTCDA are mixed.

In the case of Example 1, even after 600 cycles, a discharge capacity of approximately 160 mAh/g was observed, showing a capacity retention of around 80%. On the contrary, in the case of Comparative Examples 1 and 2, it can be seen that a discharge capacity steeply decreases in both cases as the cycles progress, and after 300 cycles, the discharge capacity converges to a value close to 0 in both cases. From the above results, it can be seen that the PN-nanocomposite cathode electrode in which DMPZ and PTCDA are mixed has superior lifespan characteristics to the cathode electrodes using DMPZ and PTCDA, respectively, as a single material.

Figure 5:
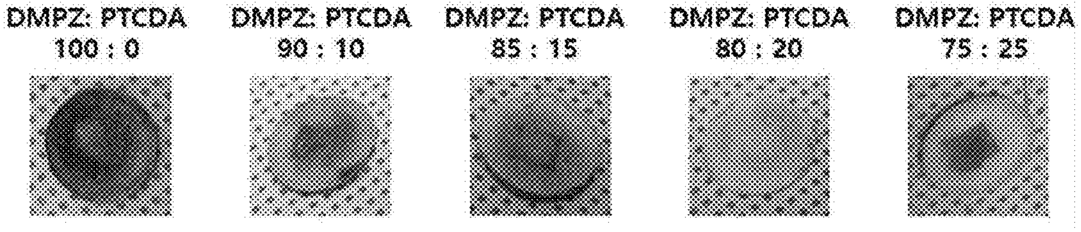
FIG. 5 shows pictures showing changes in the color of a separator according to the content of organic compounds in a cathode active material according to some embodiments of the present invention.
Figure 6:
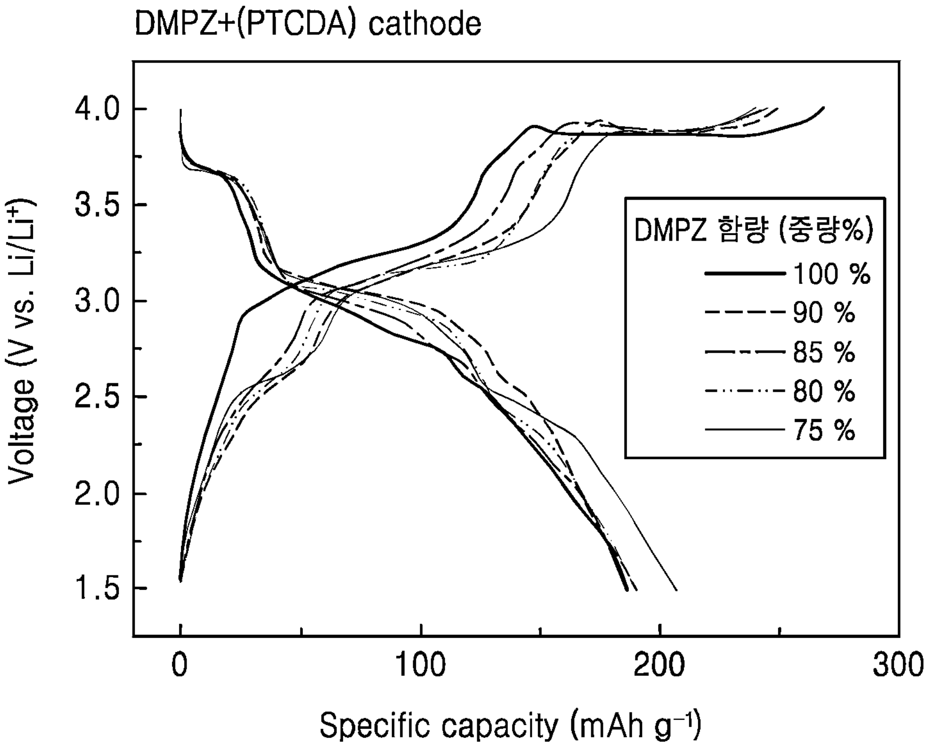
FIG. 6 is a graph showing characteristics of a secondary battery according to the content of organic compounds in a cathode active material according to some embodiments of the present invention.

FIG. 5 shows pictures showing changes in the color of a separator according to the content of organic compounds in a cathode active material according to some embodiments of the present invention, and FIG. 6 is a graph showing characteristics of a secondary battery according to the content of organic compounds in a cathode active material according to some embodiments of the present invention.

Referring to FIG. 5, as the content of PTCDA increases or decreases from 10% or more, the color change characteristics of the separator are gradually improved, and it can be seen that the separator shows the best color change when the content of DMPZ is 75% and the content of PTCDA is 25%.

Referring to FIG. 6, it can be seen that a discharge capacity may vary depending on the content ratio of DMPZ and PTCDA in a cathode active material. For example, when the content of PTCDA is 10% or more, the discharge characteristics are improved compared to the case where the content of DMPZ is 100%. Furthermore, it can be seen that the best capacity characteristics are shown when the content of DMPZ is 75% and the content of PTCDA is 25%.

Figure 7A:
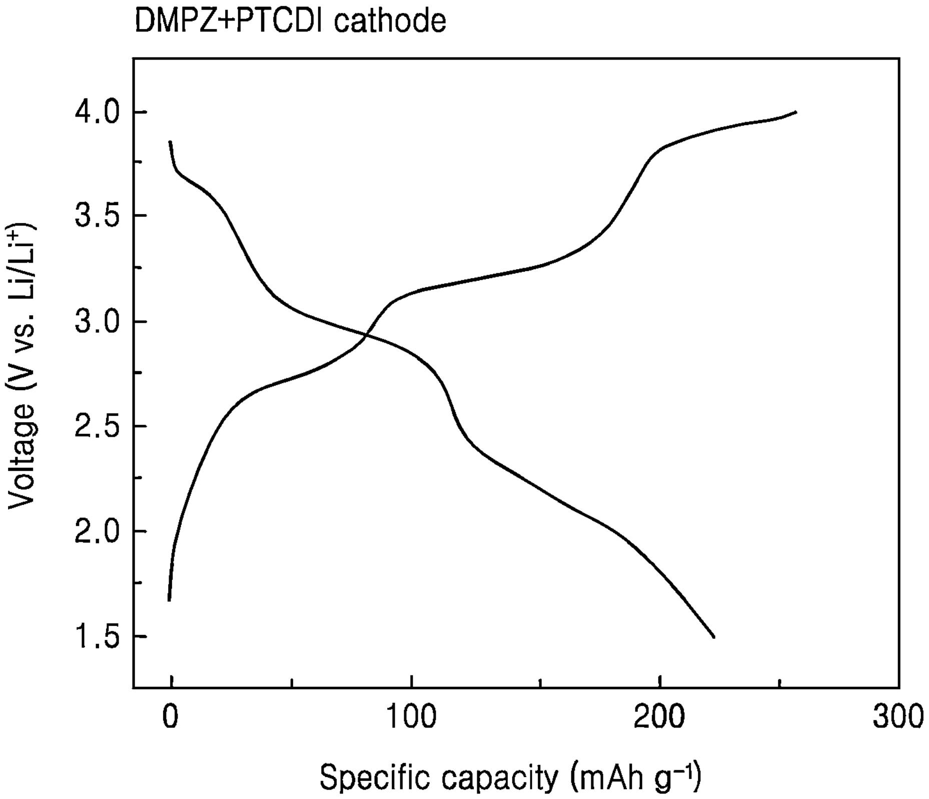
FIG. 7A and FIG. 7B are graphs showing characteristics of secondary batteries using cathode active materials according to Example 2 and Comparative Example 2.
Figure 7B:
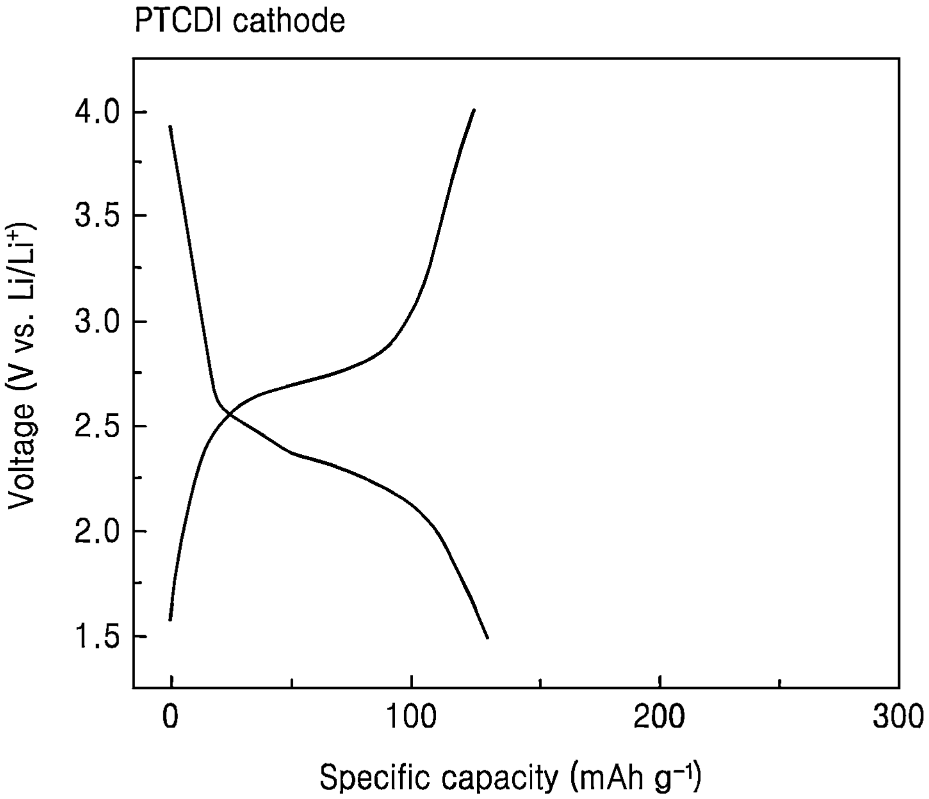

FIG. 7A shows CV characteristics of the secondary battery using the cathode active material of Example 2, and FIG. 7B shows CV characteristics of the secondary battery using the cathode active material of Comparative Example 2.

Referring to FIGS. 7A and 7B, it can be seen that Example 2 showed a plurality of voltage plateaus in similar to Example 1 and exhibited high capacity characteristics compared to Comparative Example 2.

Figure 8A:
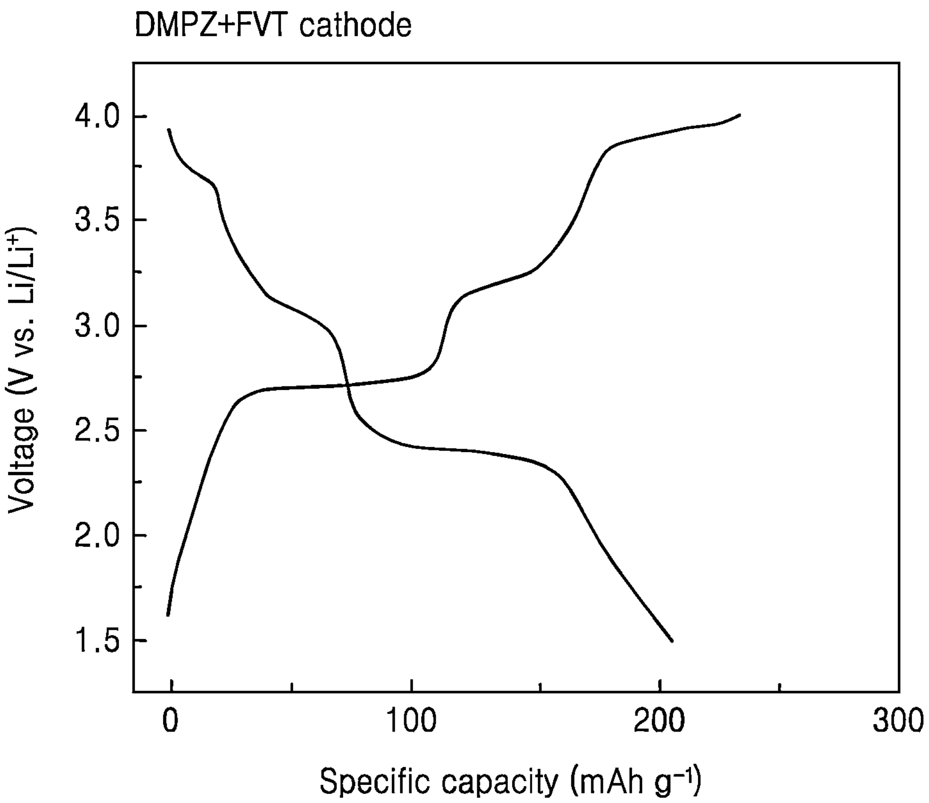
FIG. 8A and FIG. 8B are graphs showing characteristics of secondary batteries using cathode active materials according to Example 3 and Comparative Example 3.
Figure 8B:
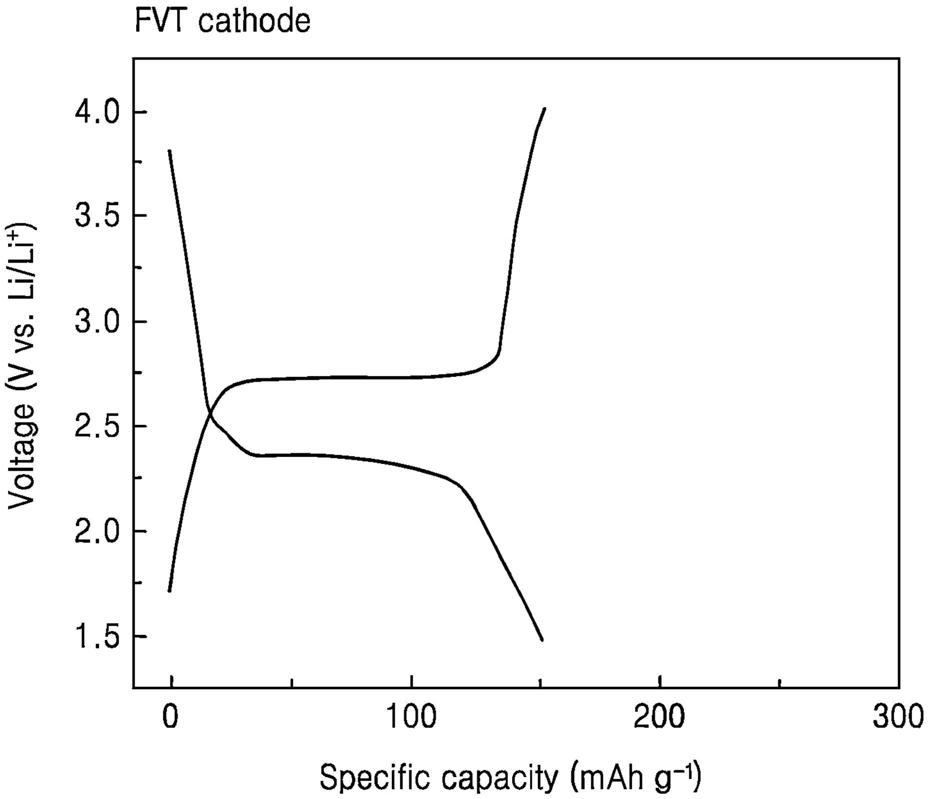

FIG. 8A shows CV characteristics of the secondary battery using the cathode active material of Example 3 and FIG. 8B shows CV characteristics of the secondary battery using the cathode active material of Comparative Example 3.

Referring to FIGS. 8A and 8B, it can be seen that Example 3 showed a plurality of voltage plateaus in similar to Example 1 and exhibited high capacity characteristics compared to Comparative Example 3.

Figure 9:
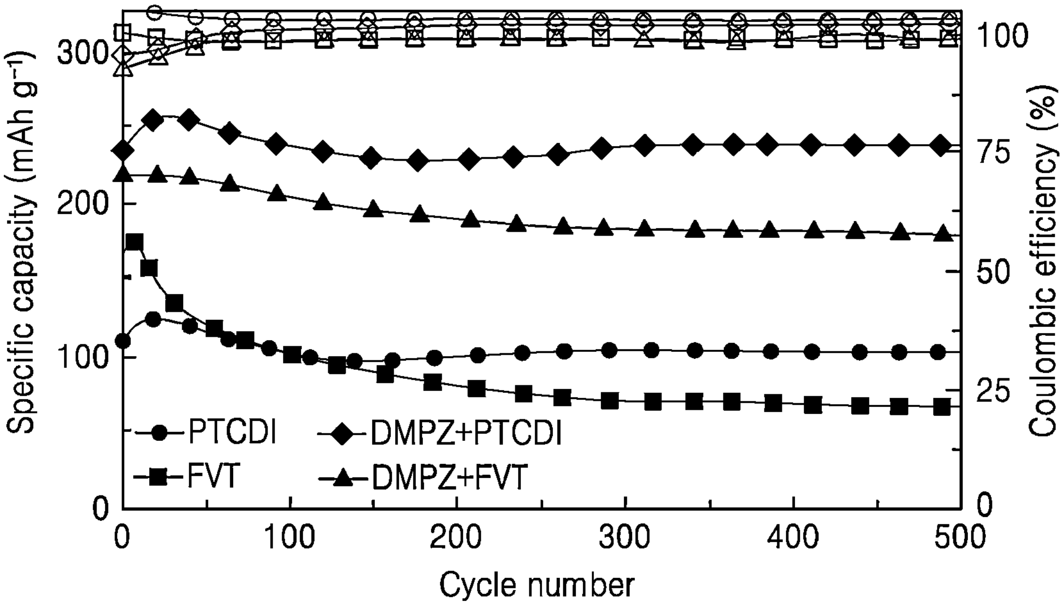
FIG. 9 is a graph showing characteristics of secondary batteries using positive electrode active materials according to Examples 2 and 3 and Comparative Examples 2 and 3.

Referring to FIG. 9, in Comparative Example 2 (PTCDI) and Comparative Example 3 (FVT), a capacity rapidly decreased within 50 cycles, whereas in Example 2 (DMPZ+PTCDI) and Example 3 (DMPZ+FVT), a decrease in capacity was not significant even after 500 cycles. Example 2 (DMPZ+PTCDI) and Example 3 (DMPZ+FVT) showed improved lifespan compared to Comparative Example 2 (PTCDI) and Comparative Example 3 (FVT).

Figure 10A:
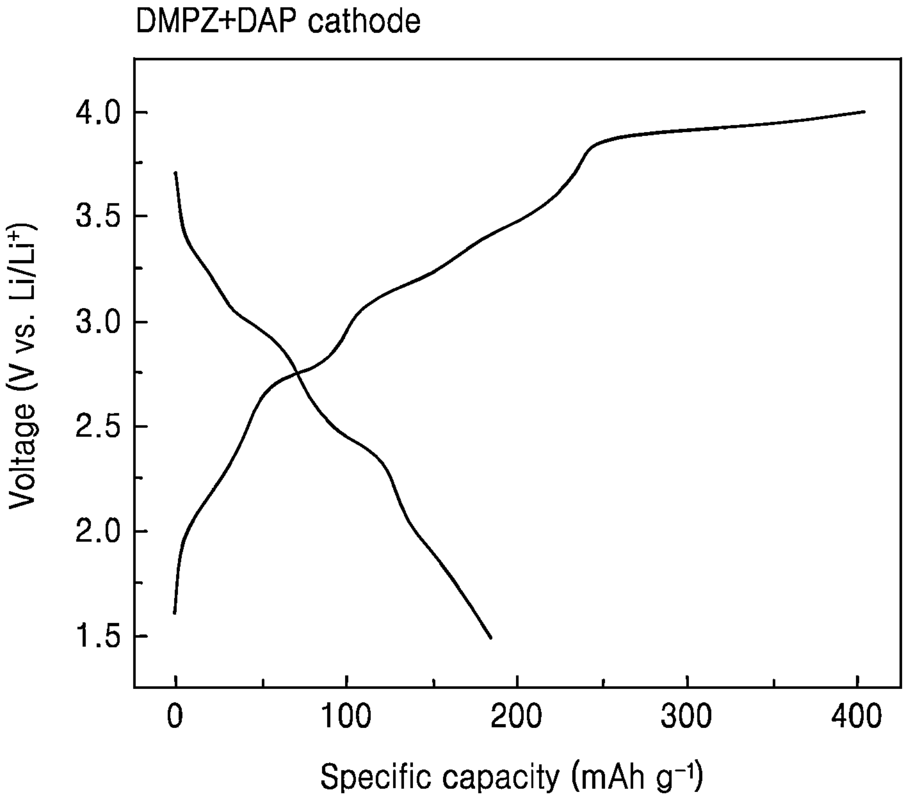
FIG. 10A and FIG. 10B are graphs showing characteristics of secondary batteries using cathode active materials according to Example 4 and Comparative Example 4.
Figure 10B:
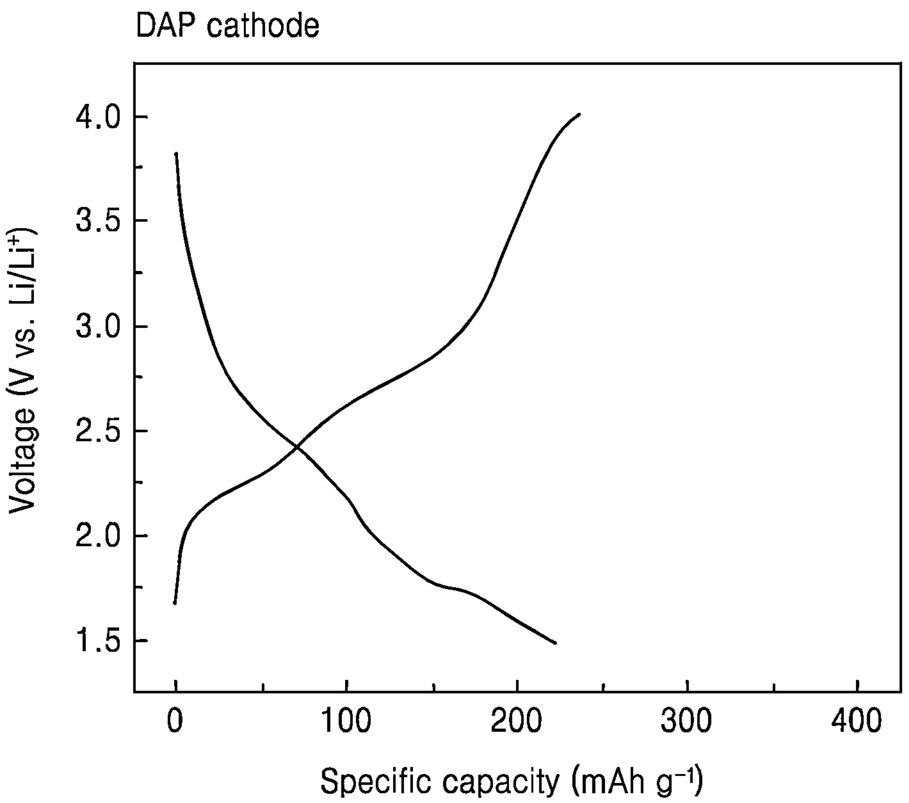

FIG. 10A shows CV characteristics of the secondary battery using the cathode active material of Example 4, and FIG. 10B shows CV characteristics of the secondary battery using the cathode active material of Comparative Example 4.

Referring to FIGS. 10A and 10B, in the case where DAP with a molecular weight of 210.2 g/mol was used as an n-type organic compound, both Comparative Example 4 in which DAP was used alone and Example 4 in which DAP was mixed with DMPZ exhibited almost no improvement in capacity characteristics. Therefore, it can be seen that the molecular weight of the n-type organic compound in the cathode active material must be somewhat greater than 210 g/mol.

Figure 11A:
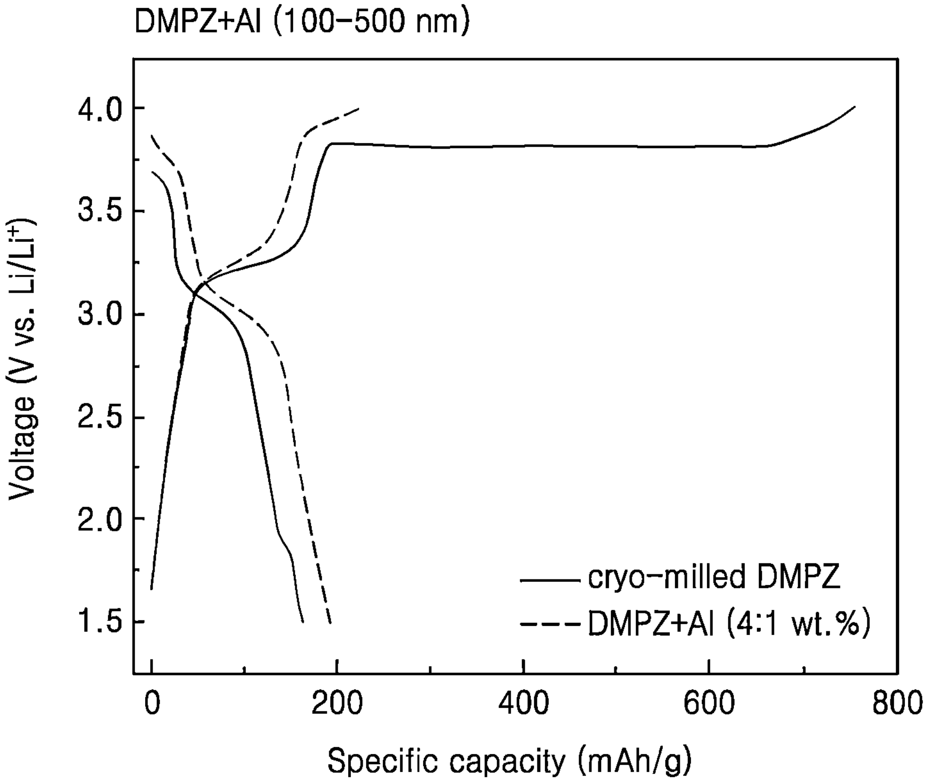
FIGS. 11A, 11B and 11C are graphs showing characteristics of secondary batteries using cathode active materials according to Examples 5 to 7 and Comparative Example 5.
Figure 11B:
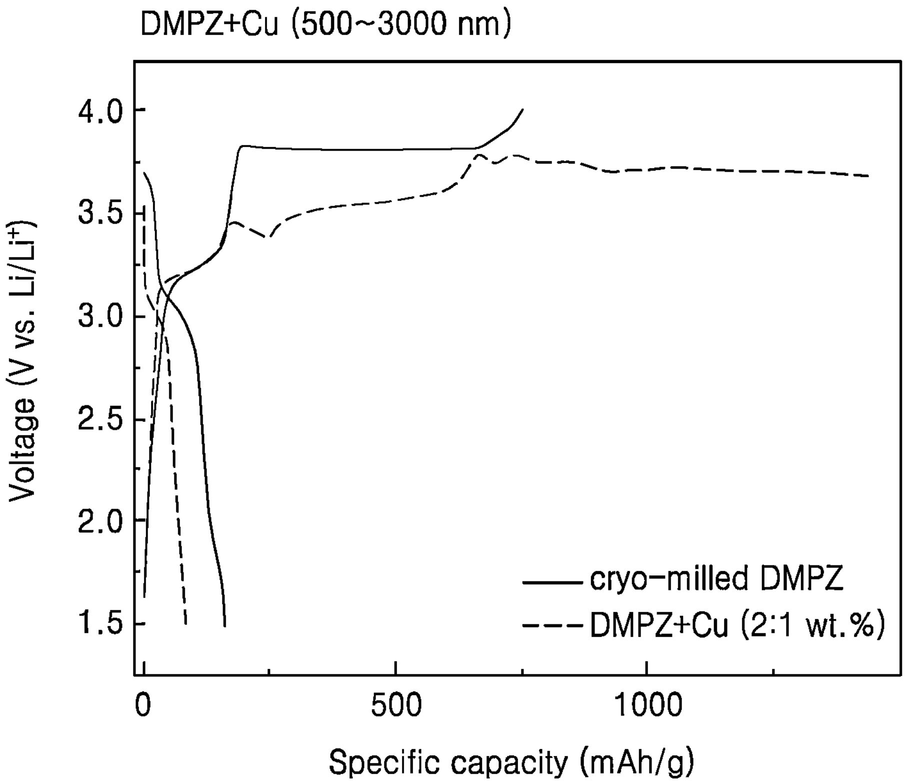

FIG. 11A shows CV characteristics of the secondary battery using the cathode active material of Example 5, and FIG. 11B shows CV characteristics of the secondary battery using the cathode active material of Comparative Example 5.

Referring to FIG. 11A, it can be seen that Example 5 (DMPZ+Al) showed slightly increased capacity compared to the case of using DMPZ alone. Meanwhile, in Example 6 (DMPZ+V) and Example 7 (DMPZ+Ru), the capacity characteristics were rarely improved or slightly decreased compared to the case of using DMPZ alone.

As shown in FIG. 11B, in Comparative Example 5 (DMPZ+Cu), elution was so severe that charge was not completed and thus the second cycle could not be performed, so that it was not possible to measure cycles. These results are applicable to Comparative Example 6 (DMPZ+B) and Comparative Example 7 (DMPZ+Zn).

Figure 11C:
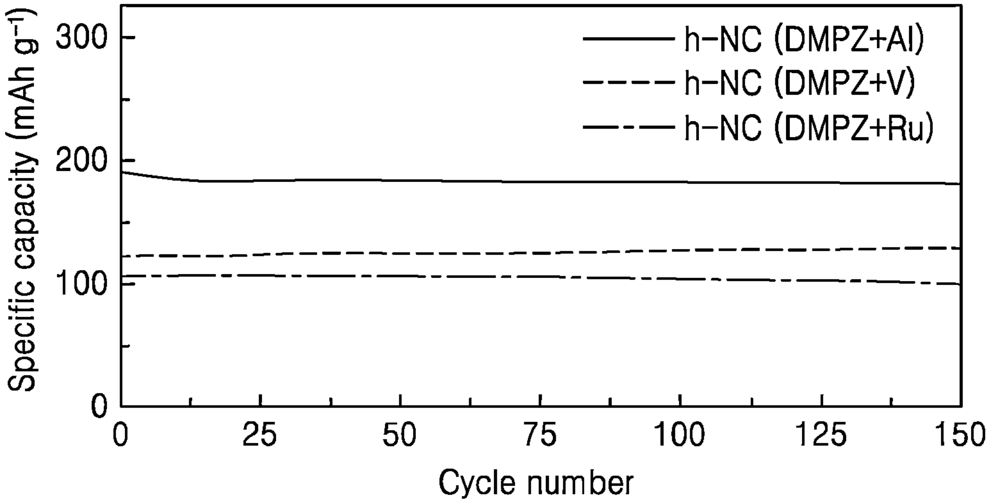

Referring to FIG. 11C, it can be seen that in Example 5 (DMPZ+Al), Example 6 (DMPZ+V) and Example 7 (DMPZ+Ru), the capacity could be maintained up to 150 cycles without change although there was a difference in the magnitude of the capacity.

Accordingly, it can be seen that the lifespan of the battery could be significantly improved when DMPZ was mixed with Al, V, or Ru powder during the preparation of the cathode active material, but when DMPZ was mixed with Cu, B, or Zn powder, it was almost impossible to use due to severe elution. Thus, it can be learned that ionization energy of the metal powder mixed with DMPZ should be less than ionization energy of CU and equal to or less than ionization energy of RU during the preparation of the cathode active material.

As described above, according to the present invention, when a cathode electrode active material in which a p-type organic compound is mixed with an appropriate n-type organic compound or metal powder is used, the lifespan characteristics may be greatly improved by suppressing elution in the secondary battery.

As described above, according to an embodiment of the present invention, it is possible to improve the lifespan of a secondary battery by suppressing elution of an organic active material using an organic active material-based nanocomposite cathode electrode.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A nanocomposite cathode electrode comprising a cathode active material, a conductive material, and a binder, wherein the cathode active material comprises a p-type organic compound and an n-type organic compound.

2. The nanocomposite cathode electrode of claim 1, wherein the p-type organic compound comprises a phenazine derivative.

3. The nanocomposite cathode electrode of claim 1, wherein the p-type organic compound comprises 5,10-dihydro 5,10-dimethylphenazine (DMPZ).

4. The nanocomposite cathode electrode of claim 3, wherein the n-type organic compound is selected to have a molecular weight greater than that of the p-type organic compound.

5. The nanocomposite cathode electrode of claim 4, wherein the molecular weight of the n-type organic compound is 300 g/mol or more.

6. The nanocomposite cathode electrode of claim 3, wherein the n-type organic compound comprises perylenetetracarboxylic dianhydride (PTCDA), 3,4,9,10-perylenetetracarboxylic diimide (PTCDI), or flavanthrone (FVT).

7. The nanocomposite cathode electrode of claim 1, wherein the p-type organic compound comprises 5,10-dihydro 5,10-dimethylphenazine (DMPZ), the n-type organic compound comprises PTCDA, and in the cathode active material, the DMPZ is present in an amount of 70% or more by weight and less than 80% by weight, and the PTCDA is present in an amount of 20% or more by weight and less than 30% by weight.

8. A method of manufacturing a nanocomposite cathode electrode, comprising: forming a mixture by mixing a cathode active material, a conductive material, and a binder; and curing the mixture, wherein the cathode active material comprises a p-type organic compound and an n-type organic compound.

9. The method of claim 8, wherein the p-type organic compound comprises 5,10-dihydro 5,10-dimethylphenazine (DMPZ).

10. The method of claim 9, wherein the n-type organic compound is selected to have a molecular weight greater than that of the p-type organic compound.

11. The method of claim 9, wherein the n-type organic compound comprises perylenetetracarboxylic dianhydride (PTCDA), 3,4,9,10-perylenetetracarboxylic diimide (PTCDI), or flavanthrone (FVT).

12. The method of claim 8, wherein the cathode active material is formed by cryo-mixing the p-type organic compound and the n-type organic compound.

13. The method of claim 8, wherein, in the cathode active material, particles of the n-type organic compound are mixed in a form attached to particles of the p-type organic compound.

14. A secondary battery comprising the nanocomposite cathode electrode according to claim 1.

* * * * *